US008372787B2

(12) United States Patent
Droger

(10) Patent No.: US 8,372,787 B2
(45) Date of Patent: Feb. 12, 2013

(54) ELECTRICALLY AND/OR MAGNETICALLY ACTIVE COATED FIBRES FOR WELLBORE OPERATIONS

(75) Inventor: Nicolas Droger, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 372 days.

(21) Appl. No.: 12/482,984

(22) Filed: Jun. 11, 2009

(65) Prior Publication Data

US 2009/0314488 A1 Dec. 24, 2009

(30) Foreign Application Priority Data

Jun. 20, 2008 (EP) ..................................... 08158700
Jan. 9, 2009 (EP) ..................................... 09150330

(51) Int. Cl.
*C09K 8/50* (2006.01)
*C09K 8/60* (2006.01)
*E21B 33/13* (2006.01)
*E21B 36/00* (2006.01)

(52) U.S. Cl. ........ 507/204; 166/248; 166/293; 166/302; 166/308.3; 166/66.5; 507/104; 507/143; 507/270

(58) Field of Classification Search ........................ None
See application file for complete search history.

(56) References Cited

U.S. PATENT DOCUMENTS

| 3,159,217 | A |   | 12/1964 | Hanson |
| 4,509,820 | A | * | 4/1985 | Murata et al. ................... 385/99 |
| 4,784,223 | A | * | 11/1988 | Worrall et al. ................ 166/287 |
| 6,039,821 | A |   | 3/2000 | Buck |
| 6,192,985 | B1 |   | 2/2001 | Henkel |
| 7,004,255 | B2 |   | 2/2006 | Boney |
| 7,011,785 | B2 | * | 3/2006 | Bauer et al. ................... 264/405 |
| 2003/0054962 | A1 |   | 3/2003 | England et al. |
| 2004/0177960 | A1 |   | 9/2004 | Chan et al. |
| 2005/0139130 | A1 |   | 6/2005 | Partain |
| 2005/0175654 | A1 |   | 8/2005 | Willberg et al. |
| 2005/0187113 | A1 |   | 8/2005 | Hayes |
| 2005/0245401 | A1 |   | 11/2005 | Chan et al. |
| 2006/0019834 | A1 |   | 1/2006 | Melbouci |
| 2006/0042797 | A1 |   | 3/2006 | Fredd et al. |
| 2006/0283591 | A1 |   | 12/2006 | Willberg et al. |
| 2008/0006413 | A1 | * | 1/2008 | Le Gloahec et al. .......... 166/369 |

FOREIGN PATENT DOCUMENTS

| JP | 62162655 A | * | 7/1987 |
| WO | 9964656 | | 12/1999 |
| WO | 03063548 | | 7/2003 |
| WO | 2005110942 | | 5/2005 |
| WO | 2007013883 | | 2/2007 |

OTHER PUBLICATIONS

Suwanwatana et al., Composites Sci. and Tech., 66, 1713-1723 (2006).
Yarlagadda et al. J. of Thermoplastic Comp. Mat., 11, 231-337 (1998).
Kim et al., Adv. Comp. Mat., 11, 71-80 (2004).
Naskar et al., Journal of Composite Materials, 40(20), 1871-1883 (2006).
Sarles et al., Proceedings of SPIE—the International Society for optical Engineering, 6173, art. No. 617316 (2006)).

* cited by examiner

*Primary Examiner* — Zakiya W Bates
(74) *Attorney, Agent, or Firm* — Matthias Abrell

(57) ABSTRACT

A composition for wellbore consolidation comprises fibers having a core formed from a material that is electrically and/or magnetically susceptible, and a polymeric coating. When the composition is placed in a wellbore in a zone to be consolidated and an electric current or magnetic field is applied, the fibers bond together by melting or setting of the polymeric coating.

15 Claims, 1 Drawing Sheet

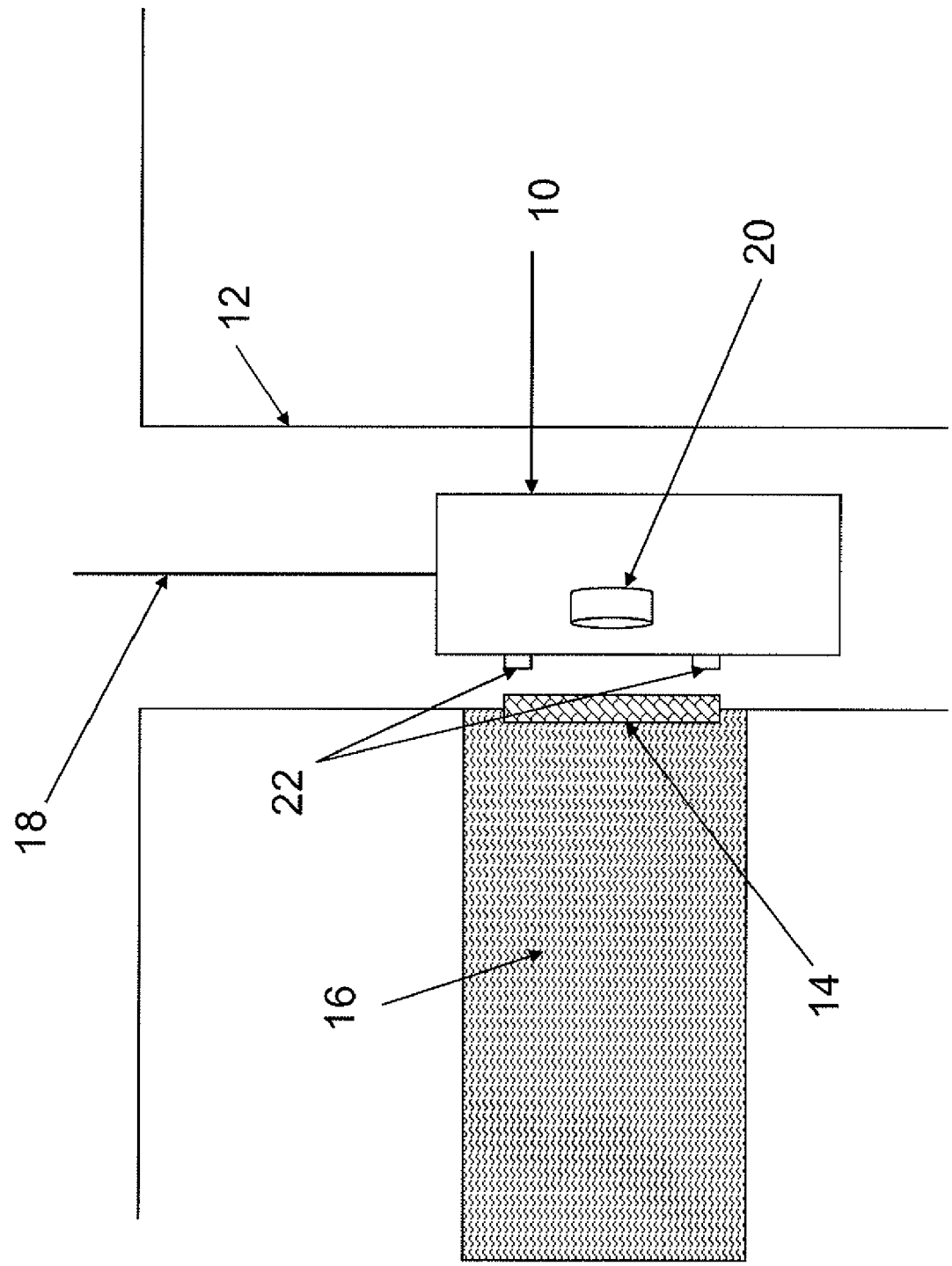

ELECTRICALLY AND/OR MAGNETICALLY ACTIVE COATED FIBRES FOR WELLBORE OPERATIONS

CROSS-REFERENCE TO RELATED APPLICATIONS

This application claims the benefit of EP Patent Application 08158700.8 filed on Jun. 20, 2008 and EP Patent Application 09150330.0 filed on Jan. 9, 2009, entitled, "Method and Product to Strengthen A Borehole."

TECHNICAL FIELD

This invention relates to the use of fibres in operations for the consolidation of formations surrounding a borehole. The invention comprises compositions, methods and apparatus that find particular use in the construction of wells of the type used in the oil and gas industry.

BACKGROUND

The statements in this section merely provide background information related to the present disclosure and may not constitute prior art.

In drilling operations such as those used in the construction of oil and gas wells, a tubular casing is generally run into the borehole and cement allowed to set in the annular space outside the casing to support or consolidate the formation before resuming drilling at a smaller diameter. However, it can be useful to be able to consolidate a weak zone without setting a casing thus avoiding a cementing operation and allowing a swifter drilling.

'Wellbore consolidation' is the process by which a wellbore is kept firm, secure or compact during drilling or cementing, or during simulation and fracture operations, so that lost circulation of fluids from the well through fractures, which can occur in any formation, is prevented. Consolidation is typically provided by mechanical or chemical means.

Mechanical means of wellbore consolidation include using setting casing or solid expandable tubulars to cover the problematic zone. Usually, a tubular casing is generally run into a borehole, and cement allowed to set in the annular space to consolidate the formation before resuming drilling at a smaller diameter.

Chemical means of wellbore consolidation involve either injecting chemicals into the naturally unconsolidated formation to provide in situ grain-to-grain cementation, or creating a good filter cake on the surface of the problematic zone. These can be performed while drilling (through drilling fluids) or after drilling through physical and/or chemical interaction of a fluid with the formation.

Fibres are already used in the oil and gas industry to prevent lost circulation during drilling (US 2006/0042797; US 2006/0019834; US 2005/0187113) and/or cementing (US 2005/0139130; WO 2005/110942). Such fibres form a net/mat inside fractures, thereby preventing fluids from entering formations. Fibres are also used during stimulation and fracture operations (U.S. Pat. Nos. 7,004,255; 6,192,985; US 2003/0054962; US 2004/0177960; US 2005/0245401; US 2005/0175654; US 2006/0283591).

In the textile industry, techniques have been proposed which involve the production of bonded, non-woven fibrous batts by the use of dry, solid, particulate, latent-cross-linkable, thermosetting, fiber-binders (U.S. Pat. No. 6,039,821; WO 1999/064656). The fibre-binder contacts the fibres to form a raw batt, with the fibre-binder loosely adhering to the fibres of the batt. The raw batt is then heated to effect the melting of the fibre-binder, which flows to intersections of the fibres then reacts with cross-linking agents with terminal reactive groups of resin, so that the raw batt is converted into a hot cross-linked batt which is then cooled to room temperature.

The polymeric component of such fibres can be heated through other means. It has been disclosed in WO 2003/063548; Gillespie et al., and many other references, including: Suwanwatana et al., *Composites Sci. and Tech.*, 66, 1713-1723 (2006); Yarlagadda et al. *J. of Thermoplastic Comp. Mat.*, 11, 231-337 (1998); Kim et al., *Adv. Comp. Mat.*, 11, 71-80 (2004) that small particles of electrically-conductive and magnetically-conductive materials ('susceptors') added into thermoplastics, which are neither electrically-conducting nor magnetically-conducting, would allow hysteresis losses; this in turn heats the susceptors and causes the thermoplastics to melt. When designed as a film between two pieces, this method allows welding to take place.

In the aerospace science industry, this method has been used to strengthen structures. Electrically conductive carbon fibres are coated with a heat-crosslinkable polymer and assembled into structures, then heated by resistive heating to allow the crosslinkage and toughening of the structure (Naskar et al., *Journal of Composite Materials*, 40(20), 1871-1883 (2006); Sarles et al., *Proceedings of SPIE—the International Society for optical Engineering*, 6173, art. no. 617316 (2006)).

This invention is based on the use of similar techniques in the oil and gas industry, the method resulting from this involving elements of both mechanical and chemical means of wellbore consolidation. In this way, weak zones can be consolidated without the need to set a casing or without the need for cementing. As a result, the drilling process can be speedier in such zones.

SUMMARY OF THE INVENTION

A first aspect of the invention comprises composition for wellbore consolidation, comprising fibres having a core formed from a material that is electrically and/or magnetically susceptible, and a polymeric coating, characterised in that when the composition is placed in a wellbore in a zone to be consolidated and an electric current or magnetic field is applied, the fibres bond together by melting or setting of the polymeric coating.

The cores of the fibres are preferably magnetic- or electrically-conductive or non-conductive, and can comprise ferro-, ferr- or antiferro-magnetic material such as ferrous metal, ferrous metal oxide or carbon fibre. In one embodiment, the cores are formed from at least two different materials.

The polymeric coating typically comprises thermoplastic or thermoset material such as polysulfone, polyester, polyimide, polyetherimide, epoxy, polyester or poly(etherimide).

The fibres are typically suspended in base fluid which can comprise drilling fluid, cement or a fracturing fluid.

The length of the fibres is selected to be mixable and pumpable with the base fluid, and typically lies tin the range 1-100 μm.

A second aspect of the invention comprises method of consolidating a formation surrounding a wellbore, comprising;
  introducing a composition according to the first aspect of the invention into the wellbore;
  allowing the fibres to accumulate in a region to be consolidated; and applying an electric current or magnetic field to cause the fibres to bond together by melting or setting of the polymeric coating.

The step of applying a magnetic field to the fibres is typically performed using a coil.

Another embodiment of the method comprises applying an electrical current directly to the composition.

A third aspect of the invention comprises apparatus for performing the method according to the second aspect of the invention, comprising a tool body that can be placed in the wellbore adjacent a region to be consolidated, and means for applying an electric current or a magnetic field to fibres accumulated in that region.

Other aspects of the invention will be apparent from the following description.

BRIEF DESCRIPTION OF THE DRAWINGS

FIG. 1 shows an apparatus for performing a method according to an embodiment of the invention.

DETAILED DESCRIPTION OF THE INVENTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

One method of wellbore consolidation according to the invention involves elements of both mechanical and chemical means of wellbore consolidation, in which weak zones can be consolidated which can avoid the need for cementing or even to set a casing, resulting in a speedier drilling process in such zones. This method involves the use of a composition comprising a cement base or a drilling fluid base (including water-based mud (WBM), oil-based mud (OBM), synthetic-based mud (SBM)) and fibres which comprise polymer and magnetic- or electrically-conductive or electrically-non-conductive cores. The composition is allowed to accumulate and then heated with a heating source comprising inductive or resistive means, and then allowed to harden and/or set.

The fibres have magnetic or electrically-conductive cores, which act as susceptors for magnetic or electric fields. This core can be made of ferrous metal (iron, nickel or steel etc), ferrous metal oxide (eg ferrite), carbon fibre, or any other ferro/ferri/antiferro-magnetic material, or dual susceptors.

The cores are coated with a polymeric material, which can be thermoplastic or thermoset, preferably continuously, but this is not mandatory.

The composition is allowed to enter fractures in the formations surrounding the wellbore and allow for the fibres to become concentrated within the fractures; enough fibres can build a web, network or mat that can be physically altered to prevent fluid from filtering through.

Once the formation is consolidated, drilling can resume (if stopped during operation).

The composition may be used in unconsolidated formations, i.e. during situations of mechanical instability related to in situ stresses, pore pressure and rock strength, or used in permeable formations (e.g. sandstone). In this case, the base of the composition comprises drilling fluid, which is filtered through the permeable formation to form a mud cake which concentrates the fibres, which allows the formation of a web, network or mat. The concentration of the fibres in the drilling fluid has to be balanced to allow for accumulation in the mud cake or fracture, but also enough to still allow for pumpability.

The accumulated fibres are heated, and the polymer melts and produces closely-cross-linked network or mat. As a result, the wellbore is consolidated because the formation will be strengthened.

To resist downhole conditions, high-Tg thermoplastics such as polysulfone (e.g., UDEL, RADEL (Solvay Advanced Polymers)); polyester (e.g., MYLAR (DuPont)); polyimide (e.g., KAPTON (DuPont Electronics)) etc. may be used.

Thermoset materials, such as epoxy (e.g., U-NYTE (Hydrosize Technologies, Inc.)); polyester; poly(etherimide) (e.g., REACTIVE ULTEM (GE Plastics)), may also be chosen among any heat-activated crosslinkable polymer. Any heat would allow curing, resulting in the hardening/rigidising of the fibres. The structure that results has higher rigidity and dimensional stability.

The exact diameter of the fibre is not normally critical but is preferably between 1 and 100 μm. The length is also generally not critical. These two parameters, however, are selected to maintain the pumpability of the fluid downhole.

The heating source can be inductive or resistive. Inductive heating is the consequence of the application of a magnetic field leading to hysteresis losses in the susceptor. The coil design is a key parameter of the process. The coil can be pancake- or solenoid-shaped depending on the application. The electricity supply can be wired or generated downhole. Frequency and power of the current have to be tuned to the susceptor specs (material, size).

Resistive heating is the consequence of the application of an electric current through the susceptor. Joule's law describes the heat loss as a function of the power. Again the electricity supply can be wired or generated downhole. The frequency and power of the current have to be tuned to the susceptor specifications (material, size).

FIG. 1 shows an apparatus according to the invention. This apparatus comprises a tool body 10 that can be positioned in a wellbore 12 adjacent a mat of fibres 14 in a region to be consolidated 16. In this example, the tool body is supported by a wireline cable 18 which provides power and control signals to the tool. The tool body 10 includes an induction coil 20 and contact electrodes 22 which can be operated to cause heating in the fibre mat 14 depending on the nature of the core of the fibre. In the example of FIG. 1, the means of conveyance and the power supply is the cable 18. In an alternative embodiment, the tool body can be conveyed on drill pipe or coiled tubing, and fluid flow can be used to drive a generator to provide power.

Variations within the scope of the invention will be apparent.

The invention claimed is:

1. A composition comprising fibres suspended into a base fluid, said fibres having cores formed from a material that is electrically and/or magnetically susceptible, wherein each core is individually coated by a polymer capable of melting or setting when the fibres are subjected to an electric current or a magnetic field.

2. The composition as claimed in claim 1, wherein the cores of the fibres are magnetic- or electrically-conductive or non-conductive.

3. The composition as claimed in claim 2, wherein the cores comprise ferro-, ferri- or antiferro-magnetic material.

4. The composition as claimed in claim 3, wherein the cores comprise ferrous metal, ferrous metal oxide or carbon fibre.

5. The composition as claimed in claim 2, wherein the cores are formed from at least two different materials.

6. The composition as claimed in claim 1, wherein the polymeric coating comprises thermoplastic or thermoset material.

7. The composition as claimed in claim 6, wherein the thermoplastic or thermoset material comprises polysulfone, polyester, polyimide, polyetherimide, epoxy, polyester or poly(etherimide).

8. The composition as claimed in claim 1, wherein the base fluid comprises drilling fluid, cement or a fracturing fluid.

9. The composition as claimed in claim 8, wherein the length of the fibres is 1-100 µm.

10. The composition of claim 1 as used in a method of wellbore consolidation.

11. The composition of claim 1, wherein the diameter of the fibre is between 1 and 100 µm.

12. A method of consolidating a formation surrounding a wellbore, comprising:
    introducing a composition as claimed in any preceding claim into the wellbore;
    allowing the fibres to accumulate in a region to be consolidated; and
    applying an electric current or magnetic field to cause the fibres to bond together by melting or setting of the polymeric coating.

13. The method as claimed in claim 12, comprising applying a magnetic field to the fibres using a coil.

14. The method as claimed in claim 12, comprising applying an electrical current directly to the composition.

15. An apparatus for performing the method as claimed in claim 12, the apparatus comprising a tool body that can be placed in the wellbore adjacent a region to be consolidated, and means for applying an electric current or a magnetic field to fibres accumulated in that region.

* * * * *